United States Patent
Munch et al.

(10) Patent No.: US 9,942,659 B2
(45) Date of Patent: Apr. 10, 2018

(54) LOUDSPEAKER TRANSDUCER ARRANGEMENT FOR DIRECTIVITY CONTROL

(71) Applicant: BANG & OLUFSEN A/S, Struer (DK)

(72) Inventors: Gert Kudahl Munch, Hjerm (DK); Jakob Dyreby, Struer (DK)

(73) Assignee: Bang & Olufsen A/S, Struer (DK)

( * ) Notice: Subject to any disclaimer, the term of this patent is extended or adjusted under 35 U.S.C. 154(b) by 0 days.

(21) Appl. No.: 15/117,158

(22) PCT Filed: Feb. 6, 2015

(86) PCT No.: PCT/DK2015/050027
§ 371 (c)(1),
(2) Date: Aug. 5, 2016

(87) PCT Pub. No.: WO2015/117616
PCT Pub. Date: Aug. 13, 2015

(65) Prior Publication Data
US 2016/0353205 A1 Dec. 1, 2016

(30) Foreign Application Priority Data
Feb. 6, 2014 (DK) ................................ 2014 00068

(51) Int. Cl.
*H03G 5/00* (2006.01)
*H04R 3/14* (2006.01)
(Continued)

(52) U.S. Cl.
CPC .............. *H04R 3/14* (2013.01); *G06F 3/165* (2013.01); *H04R 1/403* (2013.01); *H04R 3/12* (2013.01);
(Continued)

(58) Field of Classification Search
CPC . H04R 3/14; H04R 1/403; H04R 3/12; H04R 1/26; H04R 1/288; H04R 2203/12; H04R 2430/81; H04S 7/303; G06F 3/165
See application file for complete search history.

(56) References Cited

U.S. PATENT DOCUMENTS 4,503,553 A   3/1985   Davis
8,224,001 B1  7/2012   Waller
(Continued)

OTHER PUBLICATIONS

Danish Patent and Trademark Office, Search Report, dated Sep. 11, 2014.
(Continued)

*Primary Examiner* — Andrew L Sniezek
(74) *Attorney, Agent, or Firm* — Ice Miller LLP

(57) ABSTRACT

The invention relates to a loudspeaker system as well as a loudspeaker with controllable directivity as well as a method for controlling the individual sound transducer units in order to obtain a given target directivity. The loudspeaker comprises a plurality of sound transducer units distributed over two or more surfaces of a body. Each of the sound transducer units are utilized for frequency dependent a) level/gain adjustment and b) delay/phase adjustment of each individual sound transducer unit. The sound emitting transducer units are organized in two or more transducer arrays where the physical placement of transducer units included in the at least two or more transducer unit arrays are symmetrical organized and mirrored around a common axis.

21 Claims, 14 Drawing Sheets

(51) Int. Cl.
  *H04R 1/40*   (2006.01)
  *H04R 3/12*   (2006.01)
  *G06F 3/16*   (2006.01)
  *H04R 1/26*   (2006.01)
  *H04R 1/28*   (2006.01)
  *H04S 7/00*   (2006.01)

(52) U.S. Cl.
  CPC ............ *H04R 1/26* (2013.01); *H04R 1/288* (2013.01); *H04R 2203/12* (2013.01); *H04R 2430/01* (2013.01); *H04S 7/303* (2013.01)

(56) References Cited

U.S. PATENT DOCUMENTS

| | | |
|---|---|---|
| 2005/0089182 A1 | 4/2005 | Troughton et al. |
| 2005/0169493 A1 | 8/2005 | Horbach |
| 2006/0182298 A1 | 8/2006 | Stiles et al. |
| 2009/0028358 A1 | 1/2009 | Suzuki |
| 2009/0129602 A1* | 5/2009 | Konagai ............... H04R 3/12 381/17 |
| 2011/0038494 A1 | 2/2011 | Graber |
| 2013/0101144 A1 | 4/2013 | Hattori et al. |
| 2013/0177168 A1 | 7/2013 | Inha et al. |
| 2013/0322666 A1 | 12/2013 | Yoo et al. |
| 2013/0324031 A1 | 12/2013 | Loureiro |

OTHER PUBLICATIONS

PCT International Preliminary Report on Patentability, Nordic Patent Institute, dated Mar. 11, 2016.

\* cited by examiner

LOUDSPEAKER TRANSDUCER ARRANGEMENT FOR DIRECTIVITY CONTROL

CROSS-REFERENCE TO RELATED APPLICATIONS

The present application is a U.S. national stage of, and claims the priority benefit of, International Patent Application Serial No. PCT/DK2015/050027, filed Feb. 6, 2015 and Denmark Patent Application Serial No. PA 2014 00068, filed Feb. 6, 2014, the text and drawings of which are hereby incorporated by reference in their entireties.

TECHNICAL FIELD

The present invention relates generally to the field of loudspeakers and more specifically to means of controlling the directional characteristics of loudspeakers. Still more specifically, the present invention applies symmetries in the transducers configuration to obtain optimized directional characteristics of a loudspeaker system comprising a plurality of individual loudspeaker driver units.

BACKGROUND OF THE INVENTION

The directivity of loudspeakers has been subject to extensive consideration among loudspeaker designers over the years. The general consensus appears to be that investigation of the correlation between loudspeaker directivity and various perceptual aspects may be of great importance in the development of future innovative sound systems. It's known from prior art as disclosed in WO 2011/144499, Bang & Olufsen A/S and related experiments that it would be advantageous to have a single loudspeaker or loudspeaker unit, with the directional characteristics of which can be varied to obtain an optimized overall acoustical performance of the loudspeaker system.

In US2005/0169493 is described a loudspeaker array system, where same type of loudspeakers, i.e. tweeters, mid-range and woofers are arranged symmetrically in a single plane. The object of the US disclosure is to provide a compact arrangement of the loudspeakers in order to physically avoid distortion in the emitted sound, by the physical arrangement of the loudspeakers. In order to achieve this US 2005/0169493 further disclose an algorithm useable to achieve a compact plane design. In other words the algorithm is used in order to achieve the best design compromise between the perceived sound emission and the constraints of the physical design.

A further loudspeaker arrangement is known from US 2005/0169493, wherein symmetrical loudspeaker arrays are used in a omni-directional (public address) system aiming at creating a substantially even directivity in any direction from the loudspeaker.

SUMMARY OF THE INVENTION

According to the present invention there is provided a loudspeaker system which offers an extended range of loudspeaker directivities. The loudspeaker system according to the present invention implements controllable directivity.

In the following, the concept of a loudspeaker system including one or more array s of transducer unit's in a particular configuration is described. The means as disclosed enables the configuration to optimize sound directivity and with an enhanced acoustical quality as perceived by the user.

According to the invention there is provided a loudspeaker system comprising a plurality of loudspeaker transducer unit arrays. The beam pattern is steerable to a certain focus direction in the horizontal plane and a related/determined beam width in a desired direction. The beam pattern shall at least in the context of the present invention be understood as the combined pattern of sound beamed/emitted from each separate array.

Within this description loudspeaker array shall be understood as a plurality of loudspeaker units, typically of the same type, i.e. low, middle or high range which plurality of loudspeakers in the array are arranged together such that the array will beam sound in a substantially common horizontal plane. In some embodiments the speakers in the array may be tilted out of the plane of the array. This means that if all the loudspeaker units are arranged in a plane they will typically beam sound substantially perpendicular to this plane, but if one or more loudspeaker units are tilted relative to the plane, they will beam sound in a direction not perpendicular to the before-mentioned plane. In practice, however, a loudspeaker unit will beam sound in directions different from absolutely perpendicular to the plane of the loudspeaker, but when talking theoretically and in particular discussing directivity it is common to discuss the directivity direction as being perpendicular to the plane in which the loudspeaker units are arranged.

Beam pattern is to be understood as the perceived sound from a loudspeaker unit. Typically, a loudspeaker unit will direct its sound in one direction but due to the construction of the loudspeaker and the sound waves' propagation in air, there will be a certain spread of the sound relative to the intended beaming direction. This is referred to as beam width. The spread of the sound relative to the intended beaming direction (and the related sound pressure is referred to as directivity).

The invention discloses a loudspeaker configuration having a comprehensive loud sound pressure with a great density in one direction and with reduced side lobes.

In this specification, the directivity is defined as the ratio of the position dependent frequency response to the frequency response of a reference direction. The directivity is relevant only in the horizontal plane.

The preferred direction of the beam pattern is targeted against the user's position in a room; in addition the characteristics of the room and the physical placement of the loudspeaker system are included. The acoustical parameters to be adjusted, per loudspeaker transducer unit, are according to the "frequency dependent complex gain" definition. Consequently, in a first advantageous embodiment of the invention the invention provides loudspeaker transducer configuration with controlled directivity, the configuration comprising two or more loudspeaker arrays consisting, each array comprising a plurality of sound transducer units including means for each of said plurality of sound transducer units, for control of frequency dependent complex gain for each of the plurality of transducer units;

at least two of the loudspeaker arrays are arranged in a physical layout being symmetrical around a first center line related to the first loudspeaker array and where the directivity controlled by the frequency dependent complex gain for each of the plurality of transducer units of the emitted sound is directed or focused towards the listening position of a user an arrangement where at least one of the loudspeaker arrays is configured such that at least one loudspeaker transducer unit is tilted relatively to other loudspeaker transducer units in the same array.

With this configuration and by designing the means for control of frequency depending complex gain for each of the plurality of transducer units it is possible to focus the perceived sound to the listener. By furthermore arranging the loudspeaker arrays such that they not only beam straight towards the listener, but also beam in other directions, a more full and complete sound picture is provided which significantly enhances the listening experience.

A loudspeaker transducer unit configuration with controlled directivity according to a first aspect of the invention is a configuration characterized in that it includes two or more loudspeaker arrays, each array consisting of a plurality of sound transducer units where each unit is driven by an individual power amplifier and optionally including filtering means, where control means including parameters as defined by "frequency dependent complex gain", (frequency dependent gain/level, and phase/delay) is provided.

A second aspect of the invention is a loudspeaker system transducer unit configuration:
where at least two of the loudspeaker arrays are arranged in a physical layout being identical when mapped into a first plane (X,Y) in a common coordinate system;
where at least two of the loudspeaker arrays are arranged in a physical layout being identical when mapped into a second plane (Y,Z) in a common coordinate system;
where at least one of the loudspeaker arrays is configured such that at least a first loudspeaker transducer is tilted or angled relatively to a second loudspeaker transducer unit.

A third aspect of the invention is a loudspeaker system transducer unit configuration:
where the first loudspeaker array is configured to distribute high frequency sound;
where the second loudspeaker array is configured to distribute medium frequency sound;
where the third loudspeaker array is configured to distribute low frequency sound;
where the first loudspeaker array is physically located above the second loudspeaker array;
where the second loudspeaker array is physically located above the third loudspeaker array.

The directivity control is obtained by having a transfer function for each transducer unit related to any direction that may target the user. Thus, the summation of all transducer units gives the required directivity.

In a preferred embodiment of the invention the loudspeaker systems' transducer units, as configured physically, are enabled with individual parameter settings according to the premises given in:
The physical layout of the loudspeaker arrays, i.e. how the individual transducer units are organized relatively to each other, this include data values for the distance and angle.
These data include factory pre-sets and may be modified or reloaded from an external source, e.g. via a wireless link.
The position of the listener. This includes the distance and angle to the person relative to the loudspeaker system.
These data are obtained via means located at the user position, e.g. a smart phone with an "APP" exchanging pulsed data with the loudspeaker system or by alternative means embedded into the loudspeaker system, e.g. distance and angle measurement means like a camera focus point detection system.

The distance and angle data are communicated to each of the individual loudspeaker system(s) and becomes the index used as a basis to address the corresponding set(s) of adjustment parameters per transducer unit per loudspeaker system.

In another aspect of the invention each of one or more loudspeaker system transducer unit configurations including two or more loudspeaker arrays are pre-set with parameters according to factory defined values. The parameters are defined by "frequency dependent complex gain".

In yet another aspect, the directivity of the one or more loudspeaker system transducer unit configurations, is adjusted according to the preferred listening position as defined by a user.

This listening position is obtained in a dialog with the user via a command from a wireless control device. Standard means (e.g. Infrared, Radio Frequency, Bluetooth or alike) may be applied for the communication from/to the remote terminal.

From specific X,Y positions of the user relative to the one or more loudspeaker transducer unit configurations, it's possible to determine the related angle and distance information to the user or the listening position of the user. Correspondingly the specific loudspeaker transducer configuration is enabled with a set of parameters as defined for that situation.

In the preferred embodiment these correction parameter attributes may be used dynamically and consists of:
a predefined set of filter attributes are applied as the default correction filters, to be enabled in the signal path for each of the one or more speakers units, and
a predefined plurality of individual sets of filter attributes are related to different speaker positions for each of the one or more speakers, and
a predefined set of filter attributes are selected and applied as the actual correction filter to be in the signal path for each of the one or more speakers, where the set of filter attributes are selected based on the X,Y position of the speaker and the listener.
a predefined plurality of individual set of filter attributes related to speaker positions for each of the one or more speakers may be replaced with data from an external source.

Further advantageous embodiments of the inventions are set out in the depending claims relating to the loudspeaker transducer configuration. Particularly, one embodiment is interesting in that all transducer units are arranged in a dampened compartment in individual physical volumes per transducer unit. This facilitates that although the loudspeaker transducer units are arranged in a common loudspeaker unit by providing individual physical volumes per transducer unit there will be no interference from the rear-side of the transducer unit which could otherwise interfere with the correct sound emission which could be distorted due to neighboring/adjacent transducer units.

Also, by designing the individual physical volumes properly it is possible to optimize the performance of each and any individual transducer unit separately from the rest of the transducer unit.

The invention is also directed to a loudspeaker per se, i.e. a loudspeaker including a loudspeaker transducer configuration with controlled directivity as claimed in any of the claims mentioned above where said loudspeaker has a housing having at least four side faces and where loudspeaker units from each array is arranged in at least three of said at least four side faces. By providing a loudspeaker where loudspeaker units from each array is arranged in at least three side surfaces it is clear that the control of the directivity using the frequency dependent complex gain method will delay/accelerate the sound emission from the individual speakers such that a high quality sound performance is perceived by the user in the listening position as the control unit and the directivity will be directed directly at a user. By arranging the loudspeaker units in different side surfaces of the loudspeaker it is achieved that the side lopes are present and help to fill out the sound picture, but due to the controlled directivity a listener to which the directivity is directed will perceive the emitted sound as a full and broad sound picture providing the best sound reproduction.

In a further advantageous embodiment all transducer units, drivers, filters, amplifiers and power supply units are contained in or inside said loudspeaker housing, and where said housing on an outer surface is provided with cooling means for said amplifiers and power supply units.

With this embodiment the loudspeaker becomes a substantially self-contained unit where only a signal cable and a power supply cable need to be connected appropriately in order for the loudspeaker to be working. By integrating all the transducer units, drivers, filters, amplifiers and power supply units inside or in the loudspeaker, the loudspeaker would become relatively warm during use, but by providing cooling means on an outer surface of the speaker it is possible to control the working temperature of the loudspeaker such that the provision of all the equipment inside or in the loudspeaker does not affect the performance of the loudspeaker.

In a still further advantageous embodiment of the invention the housing is made from a cast material, where said cast material is selected among one or more of the following: aluminum or an aluminum alloy, cast steel, cast iron, cement-based fiber reinforced high strength concrete or modified resin based materials. Traditionally, housings for loudspeakers have been made from various wood products or steel cages, but by providing a solid loudspeaker housing a number of advantages are achieved.

One advantage is that during use the housing will tend to be very stiff and robust and heavy and as such any power, for example provided to low frequency loudspeaker units will be translated into sound emission and not be absorbed by a thin or non-stiff housing which is otherwise the case.

Furthermore, due to the usually heavy materials which are used for casting these types of objects, any vibrations from the loudspeaker units will not be transferred by means of the housing, but will be countered and absorbed by the cast material such that each and every loudspeaker transducer unit will be free from influence from any other loudspeaker transducer units provided in the same housing.

In a still further advantageous embodiment of the invention at least two of said side faces are not planar. Traditionally, loudspeakers are provided with substantially planar/flat surfaces in order to be able to direct the sound to a listening position/user without distortion and interference from adjacent loudspeaker units.

However, with the directivity control provided by the present invention it is possible to provide non-planar side surfaces which in addition to providing optimum sound distribution/emission in a horizontal plane relative to the user also will be able to provide sound in a vertical plane which to a user may provide a fuller sound-perceived picture. At the same time, by being able to provide non-planar side surfaces the loudspeaker design may be conceived more imaginatively than what was previously the case.

BRIEF DESCRIPTION OF THE DRAWINGS

The invention will be better understood by reading the following detailed description of an embodiment of the invention and with reference to the figures of the drawing, wherein.

DETAILED DESCRIPTION OF THE INVENTION

Figure 1:
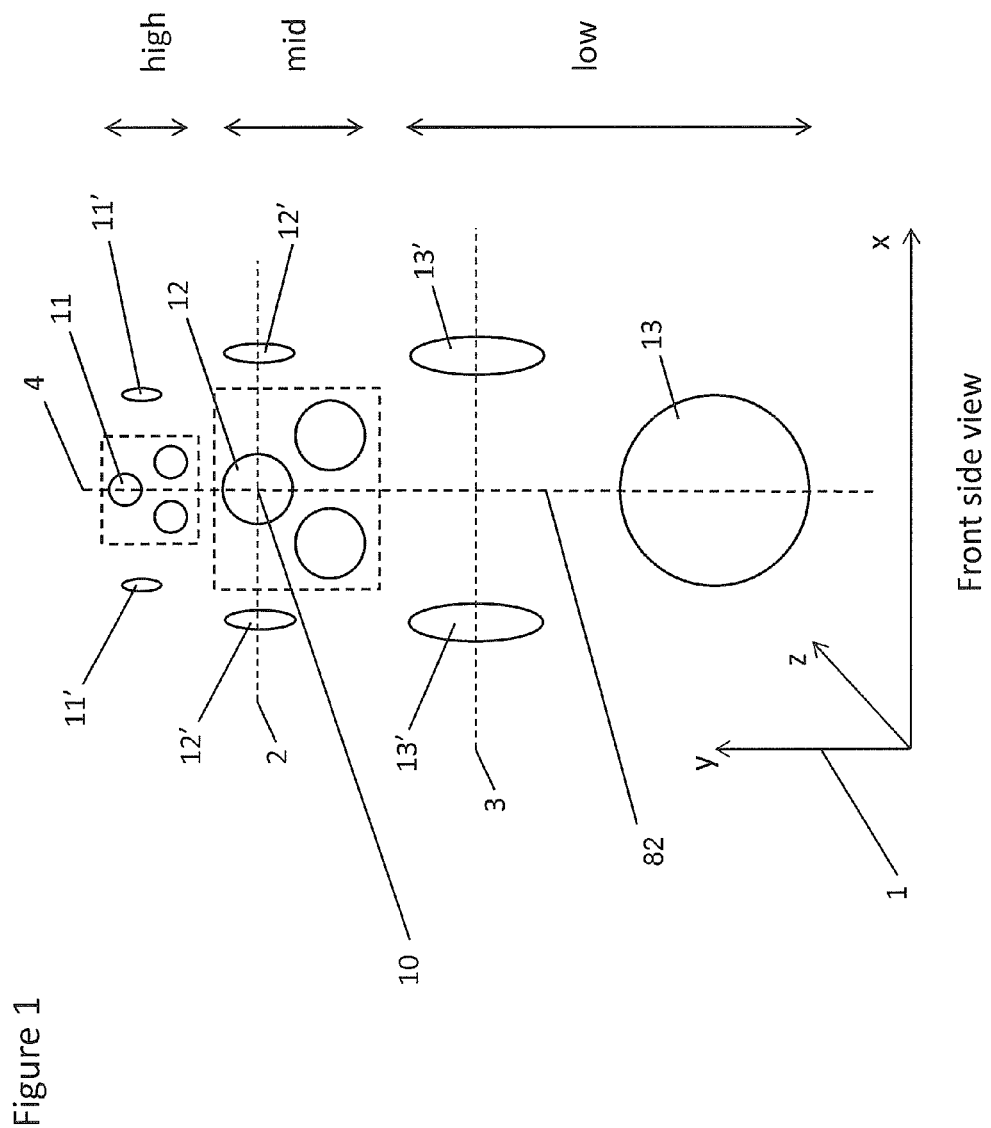
FIG. 1 shows a front side view of a preferred embodiment of a loudspeaker system transducer unit configuration.

In the following detailed description reference numerals and characters may be used to designate identical, corresponding or similar components in different drawings or figures. Furthermore, examples, sizes, models, values, ranges may be given with respect to specific embodiments, but are not to be considered generally limiting. In circuit diagrams well-known power and ground connections and similar well-known elements may be omitted for the sake of simplicity of illustration.

In the following, the concept of a loudspeaker system including one or more arrays of transducer unit's in a particular configuration is described. The means as disclosed enables the configuration to optimize sound directivity and with an enhanced acoustical quality as perceived by the user.

A loudspeaker system according to the invention may include stereo—or any multichannel configurations.

FIGS. 7a) and b) illustrates typical examples of stereo (FIG. 7a)—, and a 5-channel system (FIG. 7b). The user's face (listening position 100) is oriented in a direction towards the loudspeakers (71,72,73,76,77); this direction becomes the line (82) for the directivity to be enabled, with the user as the target such that the entire loudspeaker system will be controlled by the means to provide optimum listening in this particular direction (82).

Figure 2:
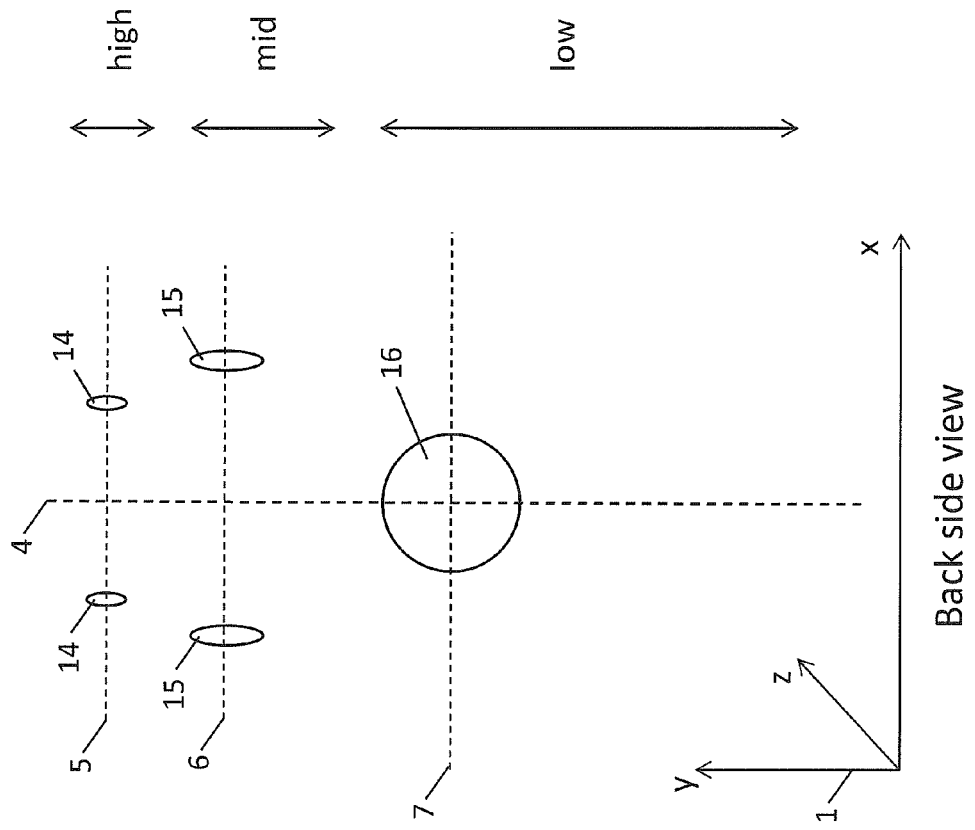
FIG. 2 shows a back side view of a preferred embodiment of a loudspeaker system transducer unit configuration.
Figure 4:
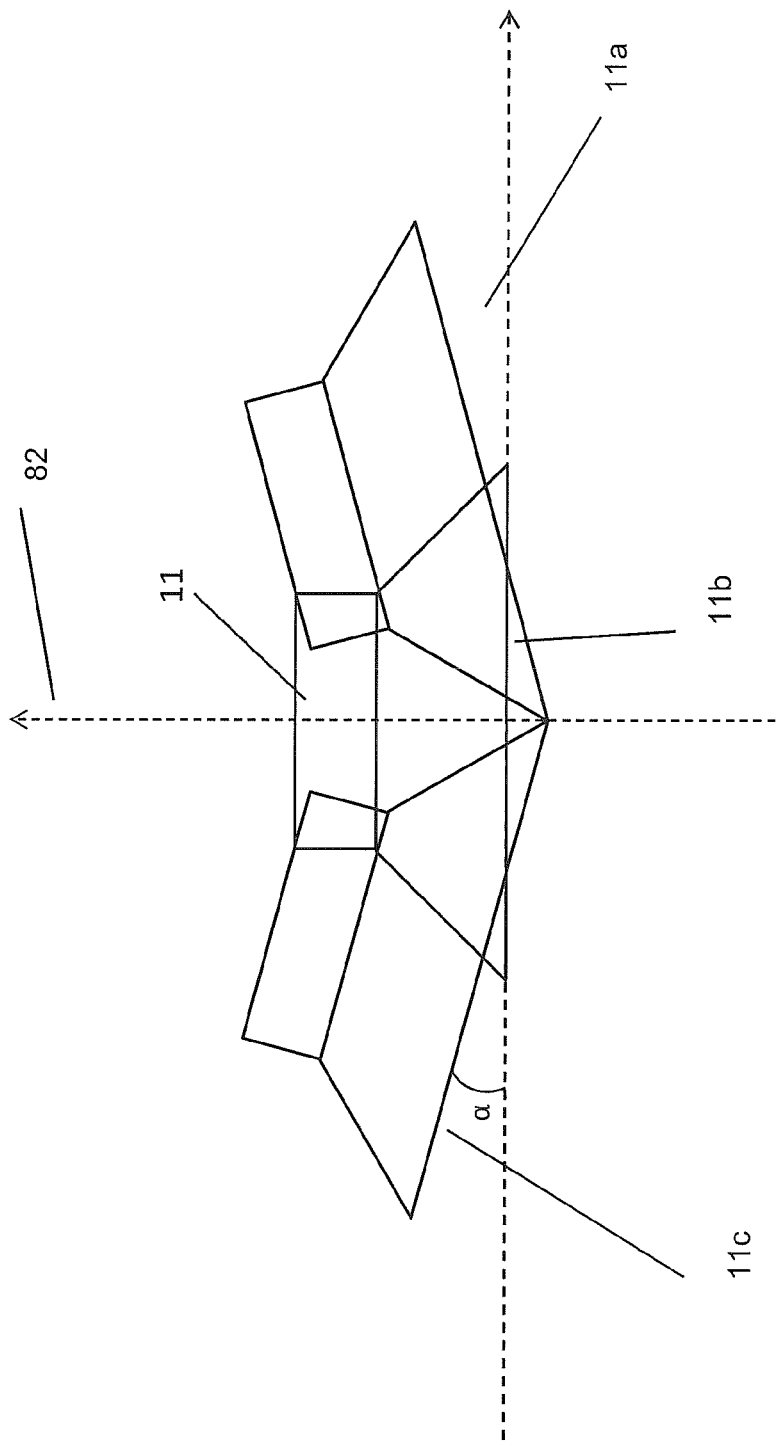
FIG. 4 shows a cross sectional view of details in the transducer unit arrangement.

A loudspeaker transducer unit configuration with controlled directivity according to a first aspect of the invention is a configuration characterized in that it includes two or more loudspeaker arrays (5,6,7), see FIG. 2. Each array consisting of a plurality of sound transducer units. In FIG. 4 is illustrated an array 11 comprising three units (11a,11b, 11c). Each unit (11a,11b,11c) is driven by an individual power amplifier and optionally including filtering means, where control means including parameters as defined by "frequency dependent complex gain", (frequency dependent gain/level, and phase/delay) is provided. Various other array configurations may be contemplated, but they are in principle as illustrated in FIG. 4.

Figure 5:
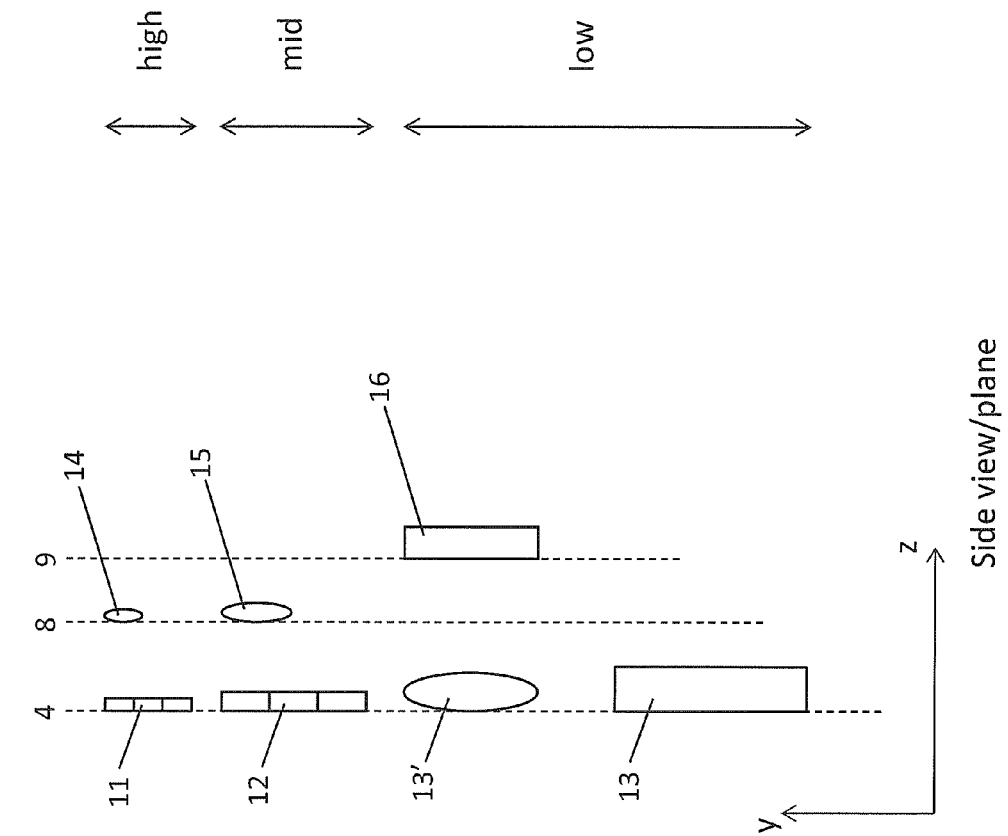
FIG. 5 shows a side view of a preferred embodiment of a loudspeaker system transducer unit configuration.

A second aspect of the invention is a loudspeaker system transducer unit configuration:
- where at least two of the loudspeaker arrays (5,6,7) are arranged in a physical layout being identical when mapped into a first plane (X,Y) in a common coordinate system, as illustrated in FIGS. 1, 2 and 5.
- where at least two of the loudspeaker arrays (11,12,13) are arranged in a physical layout being identical when mapped into a second plane (Y,Z) in a common coordinate system, as also illustrated in FIGS. 1, 2 and 5.
- where at least one of the loudspeaker arrays is configured such that at least a first loudspeaker transducer (11',12', 13') is tilted or angled relative to a second loudspeaker transducer unit (11,12,13).

A third aspect of the invention is a loudspeaker system transducer unit configuration:
- where the first loudspeaker array (5,11) is configured to distribute high frequency sound;
- where the second loudspeaker array (6, 12) is configured to distribute medium frequency sound;
- where the third loudspeaker array (7, 13) is configured to distribute low frequency sound;
- where the first loudspeaker array (5,11) is physically located above the second loudspeaker array (6,12);
- where the second loudspeaker array (6,12) is physically located above the third loudspeaker array (7,13).

The directivity control is obtained by having a transfer function for each transducer unit related to any direction that may target the user. Thus, the summation of all transducer units gives the required directivity.

In a preferred embodiment of the invention the loudspeaker systems' transducer units, as configured physically, are enabled with individual parameter settings according to the premises given in:
- The physical layout of the loudspeaker arrays (5,6,7,11, 12,13), i.e. how the individual transducer units are organized relatively to each other, this include data values for the distance and angle. With "distance" and "angle" shall be understood the relative angle between the axis along which the single transducer units emits sound and with distance shall be understood the relative distance between the various units comprised in the array or loudspeaker configuration.
  These data include factory pre-sets and may be modified or reloaded from an external source, e.g. via a wireless link.
- The position of the listener. This includes the distance and angle to the person relative to the loudspeaker system.
  These data are obtained via means located at the user's position, e.g. a smart phone with an "APP" exchanging pulsed data with the loudspeaker system or by alternative means embedded into the loudspeaker system, e.g. distance and angle measurement means like a camera focus point detection system.
- The distance and angle data are communicated to each of the individual loudspeaker system(s) and becomes the index used as a basis to address the corresponding set(s) of adjustment parameters per transducer unit per loudspeaker system.

In another aspect of the invention each of one or more loudspeaker system transducer unit configurations including two or more loudspeaker arrays (5,6,7) are pre-set with parameters according to factory defined values. The parameters are defined by "frequency dependent complex gain".

In yet another aspect, the directivity of the one or more loudspeaker system transducer unit configurations, is adjusted according to the preferred listening position as defined by a user.

This listening position is obtained in a dialog with the user via a command from a wireless control device. Standard means (e.g. Infrared, Radio Frequency, Bluetooth or alike) may be applied for the communication from/to the remote terminal (wireless control device).

From specific X,Y positions of the user relative to the one or more loudspeaker transducer unit configurations, it's possible to determine the related angle and distance information to the user or the listening position of the user. Correspondingly the specific loudspeaker transducer configuration is enabled with a set of parameters as defined for that situation.

In the preferred embodiment these correction parameter attributes may be used dynamically and consists of:
- a predefined set of filter attributes are applied as the default correction filters, to be enabled in the signal path for each of the one or more speakers units, and
- a predefined plurality of individual sets of filter attributes are related to different speaker positions for each of the one or more speakers, and
- a predefined set of filter attributes are selected and applied as the actual correction filter to be in the signal path for each of the one or more speakers, where the set of filter attributes are selected based on the X,Y position of the speaker and the listener.
- a predefined plurality of individual set of filter attributes related to speaker positions for each of the one or more speakers may be replaced with data from an external source.

In the preferred embodiment these correction filter attributes are related to the X, Y position of the loudspeaker and the user/listening position mapped into information about distance (D) and angle (A) in a simple index table in a discrete manner:

If D, A position is in the interval pos1→pos2 Then apply filter set1

| Angle | Distance | Filter | Index |
|---|---|---|---|
| Apos1 -> Apos2 | Dpos1 -> Dpos2 | Fset1 | 1 |
| | Dpos2 -> Dpos3 | Fset2 | 2 |
| | +++ | +++ | // |
| | DposN-> DposM | FsetN | N |
| Apos2 -> Apos3 | Dpos1 -> Dpos2 | Fset1.1 | N + 1 |
| | Dpos2 -> Dpos3 | Fset2.1 | N + 2 |
| | +++ | +++ | // |
| | DposN-> DposM | FsetN.1 | N + N |
| | | | // |
| Apos3 -> Apos4 | Dpos1 -> Dpos2 | Fset1.2 | 2N + 1 |
| | Dpos2 -> Dpos3 | Fset2.2 | 2N + 2 |
| | +++ | +++ | // |
| | DposN-> DposM | FsetN.2 | // |
| +++ | | | |
| AposP -> AposQ | Dpos1 -> Dpos2 | Fset1.p | // |
| | Dpos2 -> Dpos3 | Fset2.p | // |
| | +++ | +++ | // |
| | DposN-> DposM | FsetN.p | // |

The table above illustrates the mapping of positions (Angle, Distance) into filter index addressing a predefined plurality of individual set of A, D values which are related to one user position and where a predefined plurality of individual sets of other A, D coordinates are related to other user positions and where an index is related to a set of corresponding filter attributes that applies in and for that specific speaker position.

FIG. 1 displays the front side view of a preferred embodiment of the invention. A plurality of sound transducer units included in arrays is configured into a loudspeaker system including:

A transducer array enabled to provide high frequency sound, the array include three transducers (11) and two transducers (11'), the latter being tilted relatively, as being displayed slightly in perspective view. The axis of sound emission for the transducer units 11 is orthogonal to the plane of the figure whereas the corresponding axis for the transducer units 11' is angled/tilted relative to these axis, and are not orthogonal to the plane of the figure.

The transducer arrangement is symmetrical along the common Y axis (4), in an X,Y coordinate system (1).

a transducer array enabled to provide mid frequency sound, the array include three transducers (12) and two transducers (12'), the latter being tilted relatively, as being displayed slightly in perspective view, in the same manner as explained above with respect to the first array. The transducer arrangement is symmetrical along the common Y axis (4), in an X,Y coordinate system (1).

a transducer array enabled to provide low frequency sound, the array include one transducer (13) and two transducers (13'), the latter being tilted relatively, as being displayed slightly in perspective view. The transducer arrangement is symmetrical along the common Y axis (4), in an X,Y coordinate system (1).

In a preferred embodiment all transducer units are included into a damped compartment in individual physical volumes per transducer unit; this to avoid unintended acoustical emitted lobes. This is exemplified in FIG. 3b, with the separate individual volumes (17,18,19), i.e. one per transducer unit (15,12,12'). The separate individual volumes have only been illustrated in FIG. 3b but may be or are implemented for all loudspeaker transducer units in all arrays and embodiments.

In an example embodiment the transducer units are configured with:
the high frequency transducer units being 32 mm diameter, frequency 2500 Hz→4000 Hz;
the medium frequency transducer units being 86 mm diameter, frequency 250 Hz→3500 Hz;
the low frequency transducer units being 260 mm diameter, frequency 20 Hz→350 Hz.

FIG. 2 displays the back side view of a preferred embodiment of the invention. A plurality of sound transducer arrays are configured into a loudspeaker system including:

A transducer array (5) enabled to provide high frequency sound, the array includes two transducers (14) being tilted relatively, as being displayed slightly in perspective view.

The transducer arrangement (5) is symmetrical along the common Y axis (4).

a transducer array (6) enabled to provide mid frequency sound, the array includes two transducers (15) being tilted relatively, as being displayed slightly in perspective view.

The transducer arrangement is symmetrical along the common Y axis (4).

A member of the array transducer (7) is enabled to provide low frequency sound (16).

The transducer (16) is aligned symmetrical along the common Y axis (4).

In an exemplified embodiment of a loudspeaker transducer configuration according to the invention:

the number of sound sources in a first loudspeaker array is seven;
the number of sound sources in a second loudspeaker array is seven;
the number of sound sources in a third loudspeaker array is four.

This is illustrated in FIG. 3a)-c), where cross-sections (in use corresponding to horizontal cross-sections) through the first, second and third arrays (indicated by dashed lines 5,6,7 in FIG. 2) (levels) are depicted.

Figure 3:
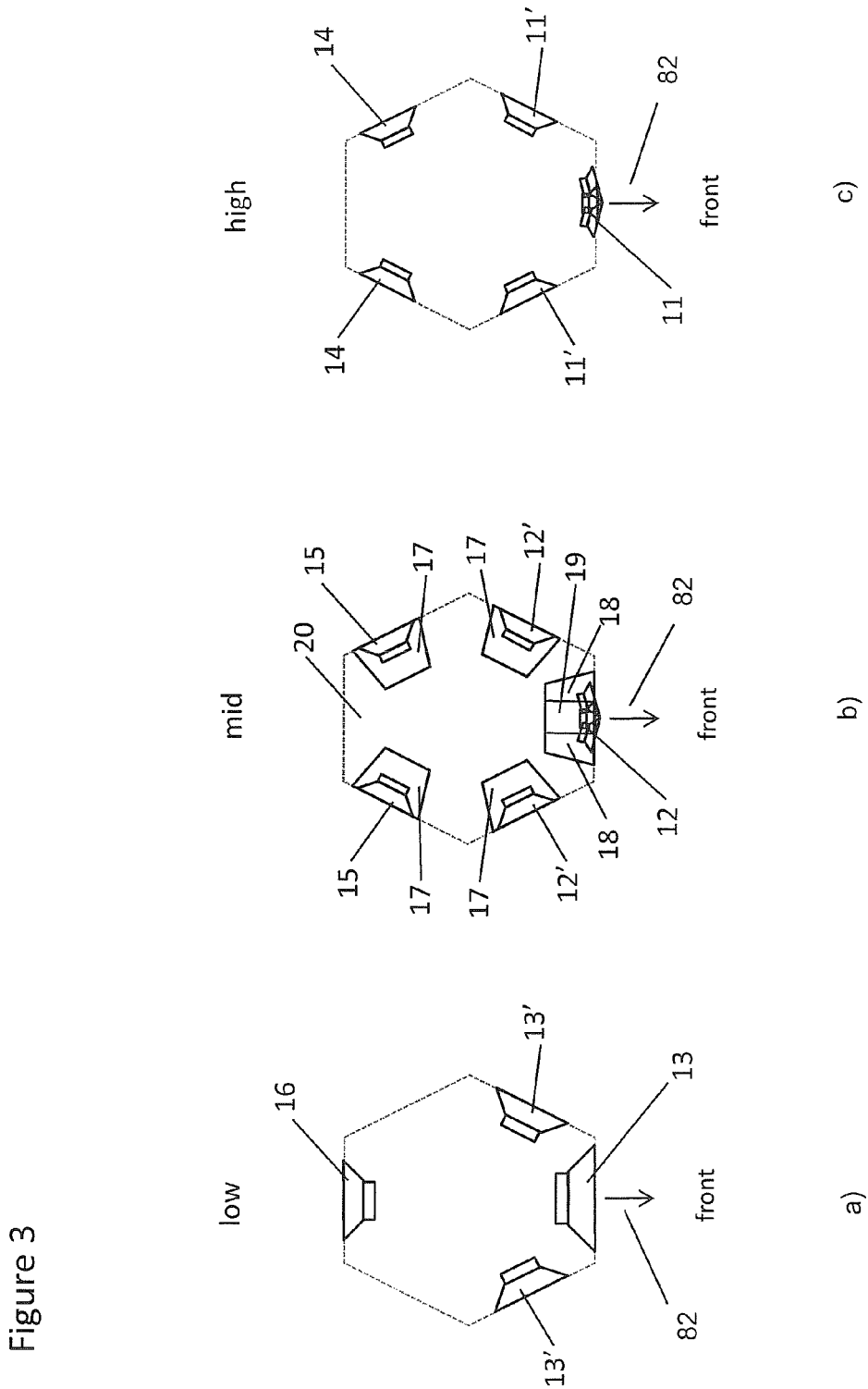
FIG. 3 shows cross sectional view of a preferred embodiment of each of the loudspeaker arrays included into a loudspeaker system transducer unit configuration.

FIG. 3 a)-c) displays a cross sectional (horizontal) view of a particular embodiment of the invention depicting a preferred loudspeaker transducer arrangement for each of the low-, mid- and high frequency sound rendering units.

As seen from the FIGS. 3a)-c) there is a symmetrical arrangement in the low-, mid- and high frequency sound rendering units. This symmetry may be fully or partly; to obtain the highest sound quality the mid frequency and the high frequency may preferable be fully symmetric.

In FIG. 3a) is illustrated the low range transducer arrangement. One transducer 13 emits sound in the direction (82) corresponding (in this embodiment at least) to the direction of directivity. Two other transducers (13') are tilted or angled relative to the first transducer (13), and the fourth transducer 16 will emit sound in a direction opposite to the direction 82.

In FIG. 3b) is illustrated a mid-level arrangement comprising seven transducers. The front transducers 12—and the front transducers 11 in the high level arrangement is arranged as illustrated in FIG. 4 (and FIG. 1)—and comprises three separate units. As indicated in FIG. 3b) the transducer units are arranged in individual physical volumes 17,18,19 integrated in the loudspeaker. These individual physical volumes may be provided for all transducer units in the loudspeaker transducer configuration, regardless of them being low-middle or high range transducers.

Transducer units may be mounted into a closed compartment (20) including individual volumes (17,18,19) per transducer unit, and including damping material as appropriate.

According to specific loudspeaker system performance requirements all or a subset of all transducer units are mounted in their own individual volumes. This applies for the low-, mid- and high loudspeaker arrays transducer units. As exemplified three transducers (12) are mounted into three volumes (18,19,18).

FIG. 4 displays a top view of the center part of the loudspeaker array, including three loudspeaker transducers units (11) and the same configuration for the loudspeaker transducer units (12). This arrangement is preferred in the mid-frequency and in the high frequency loudspeaker array. Two of the transducer units (11a,11c) in the array may be tilted with an angle α relatively to the center transducer (11b).

As exemplified this angle may be in the interval 10→20 deg. or the like.

As seen from FIG. 1, the transducers (11 and 12) are offset in the Y-direction in the X,Y plane (1), but overlapping in the X-direction.

FIG. 5 displays the side view of a preferred embodiment of the invention including:

A transducer array enabled to provide high frequency sound, the array include three transducers (11).
A transducer array enabled to provide mid frequency sound, the array include three transducers (12).
A transducer array enabled to provide low frequency sound, the array include one transducer (13) and a transducer (13'), the latter being tilted relatively to the desired direction of directivity (82—see FIGS. 3 and 4), as being displayed slightly in perspective view.

A transducer array enabled to provide high frequency sound, the array includes a transducer (14) being tilted relatively to the desired direction of directivity (82—see FIGS. 3 and 4), as being displayed slightly in perspective view.

A transducer array enabled to provide mid frequency sound, the array includes two transducers (15) being tilted relatively to the desired direction of directivity (82—see FIGS. 3 and 4), as being displayed slightly in perspective view.

A member of the array transducer is enabled to provide low frequency sound (16).

As seen from the FIG. 5 the preferred embodiment defines a configuration in which the sound transducers are arranged in two or more planes (4,8,9) off set along the Z axes.

An important aspect in a transducer unit array configuration is that, the transducer units are close together and they are perceived, acoustically, as being one entity.

Figure 6:
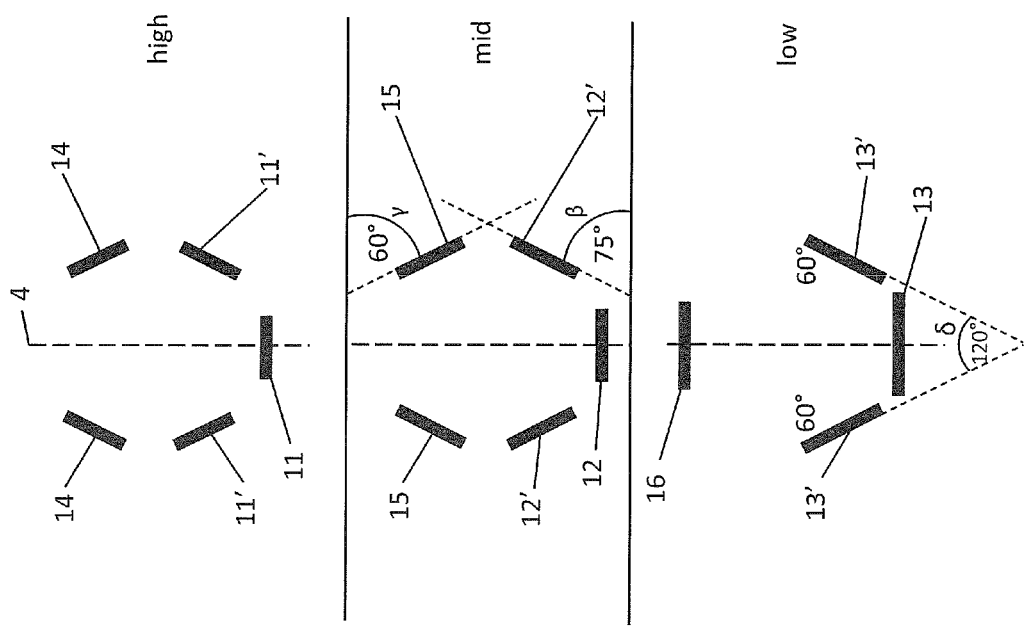
FIG. 6 shows a cross sectional view with angle details in the transducer unit arrangement.

FIG. 6 displays a cross sectional (horizontal) view of loudspeaker transducer unit arrangement for each of the low-, mid- and high frequency sound rendering units.

As seen from the figures there is a symmetrical arrangement in the three systems. To make it possible to obtain flexibility in the feature of generating the directivity in multiple directions two or more of the sound transducers are tilted or angled relative to the front of the loudspeaker system.

Examples are illustrated with one transducer (15) tilted with the angle γ, as exemplified this angle may be in the interval 30→90 deg. or the like.

Another transducer (12') tilted with the angle β, as exemplified this angle may be in the interval 60→90 deg. or alike.

Another transducer (13') tilted with the angle δ, as exemplified this angle may be in the interval 60→120 deg. or alike.

Figure 7:
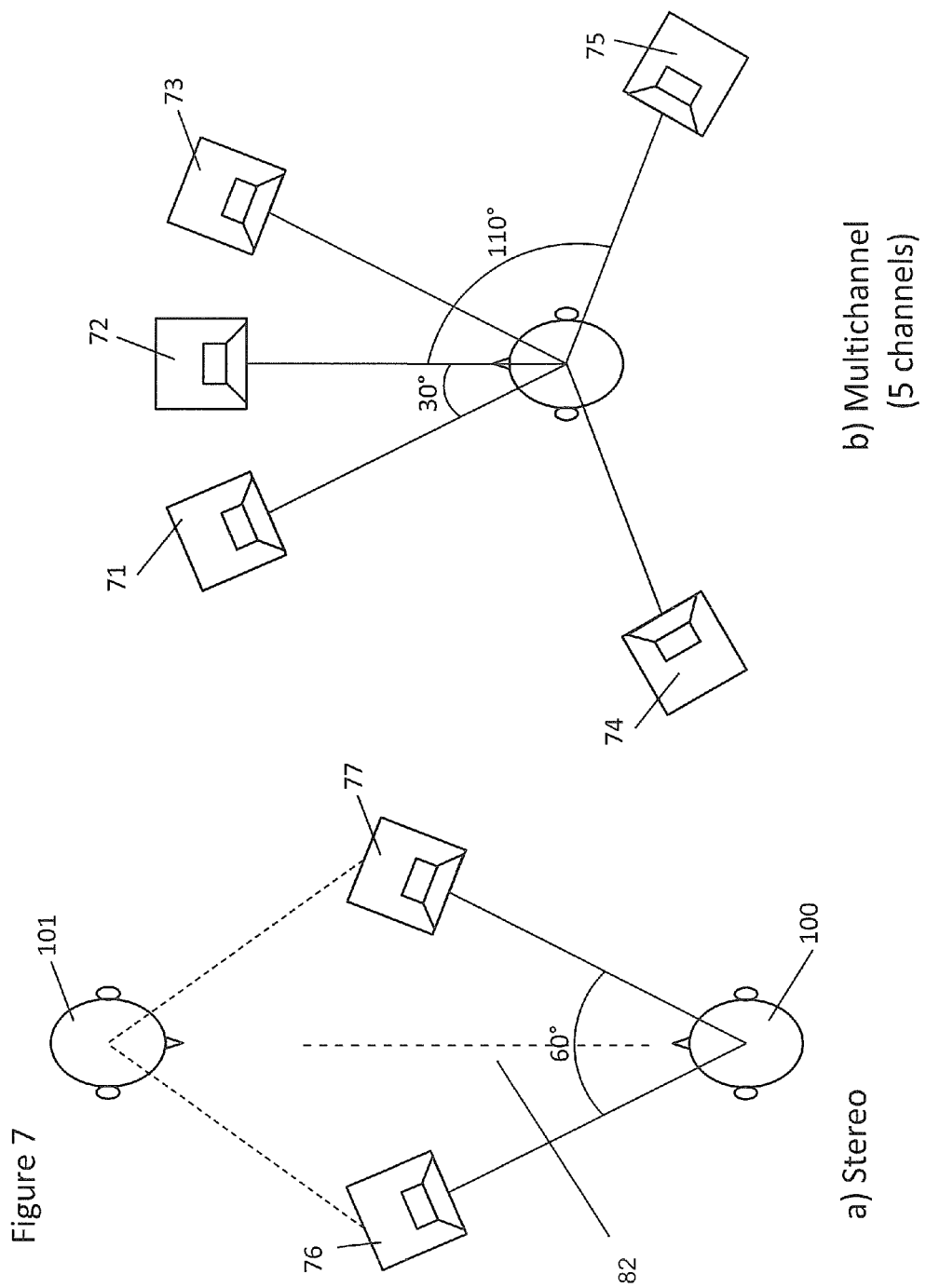
FIG. 7 shows two examples of loudspeaker systems setup and listener positions.

FIG. 7 displays two examples of preferred embodiments with a stereo setup (7.*a*) and a multichannel system with 5 channels (7.*b*). The stereo setup including two loudspeaker systems according to the invention, and has a Left channel (76) and a Right channel (77). The optimal listening position is as indicated with the user position (100), where the user faces the front—and the center line of the loudspeaker system (intended direction of directivity). Alternatively the user may move to any other listing positions (101) and reconfigure the loudspeaker system to adapt to that listening position accordingly. Obviously the perceived sound quality, in these alternative positions, has a lower quality compared to the optimal, where the user being in the front of the center line of the loudspeaker system. Same considerations apply to the set-up as illustrated in FIG. 7*b*).

Figure 8:
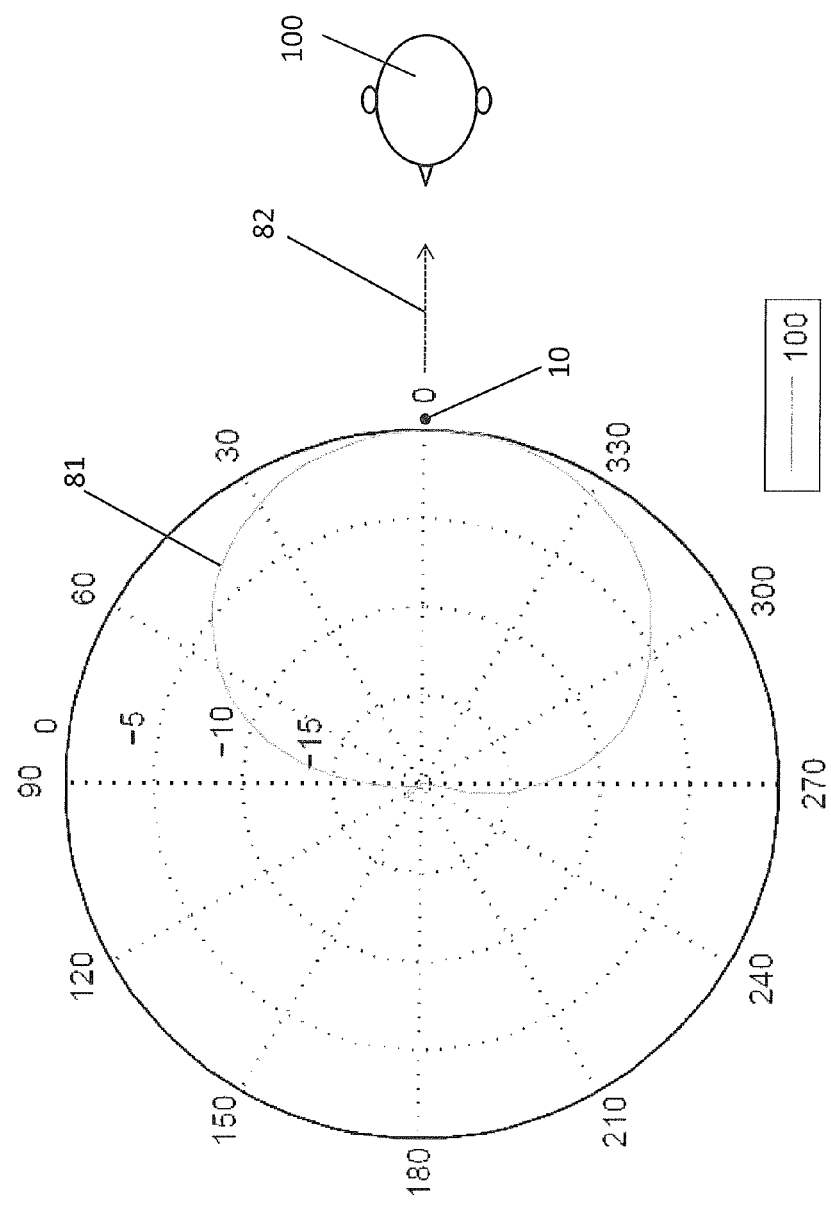
FIG. 8 shows one beam pattern related to directivity for an embodiment of the invention.

FIG. 8 illustrates in a common manner the beam patter from a given loudspeaker transducer. The loudspeaker transducer is positioned at the center of the circle, where the transducers direction of sound emission is along the radian indicated by "0". The "kidney-shaped" FIG. 81) illustrates the spread of sound from the loudspeaker, also referred to as directivity, indicating direction (degrees along the periphery of the circle) and sound pressure (indicated as dampening (dB): higher sound pressure the further along the radian towards the periphery).

Consequently FIG. 8 displays one beam pattern, related to 100 Hz and having the directivity (81) for an embodiment of the invention. The best performance is obtained when the center line of the loudspeaker system (10) is aligned with the direction (82) to the target, i.e. to the listening position (100). A listener (not illustrated) positioned behind the loudspeaker transducer, i.e. at 180 degrees would not receive any sound.

Turning to FIGS. 11-14 various directivity patterns corresponding to the kidney-shaped directivity 81 in FIG. 8 are illustrated.

Figure 9:
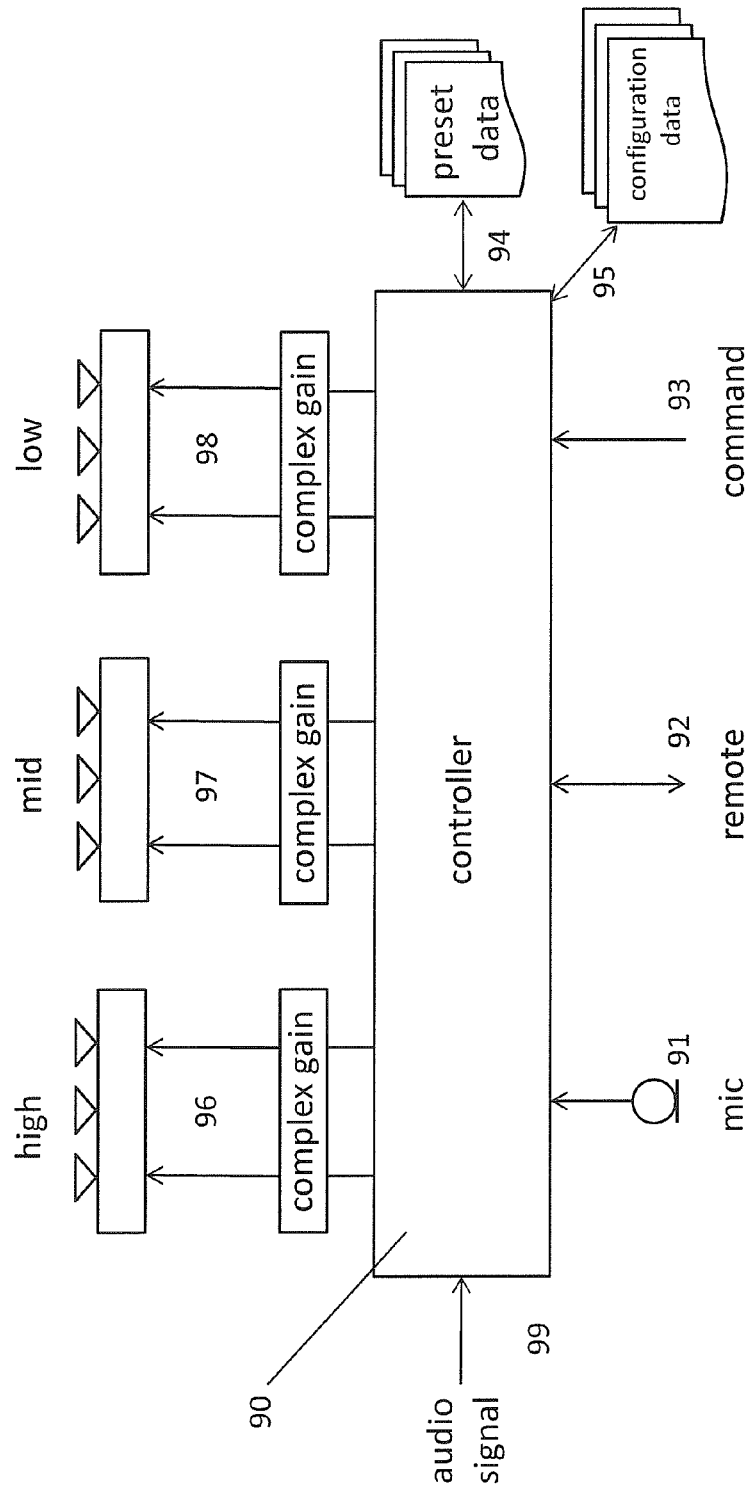
FIG. 9 shows a system controller block diagram for an embodiment of the invention.
Figure 10:
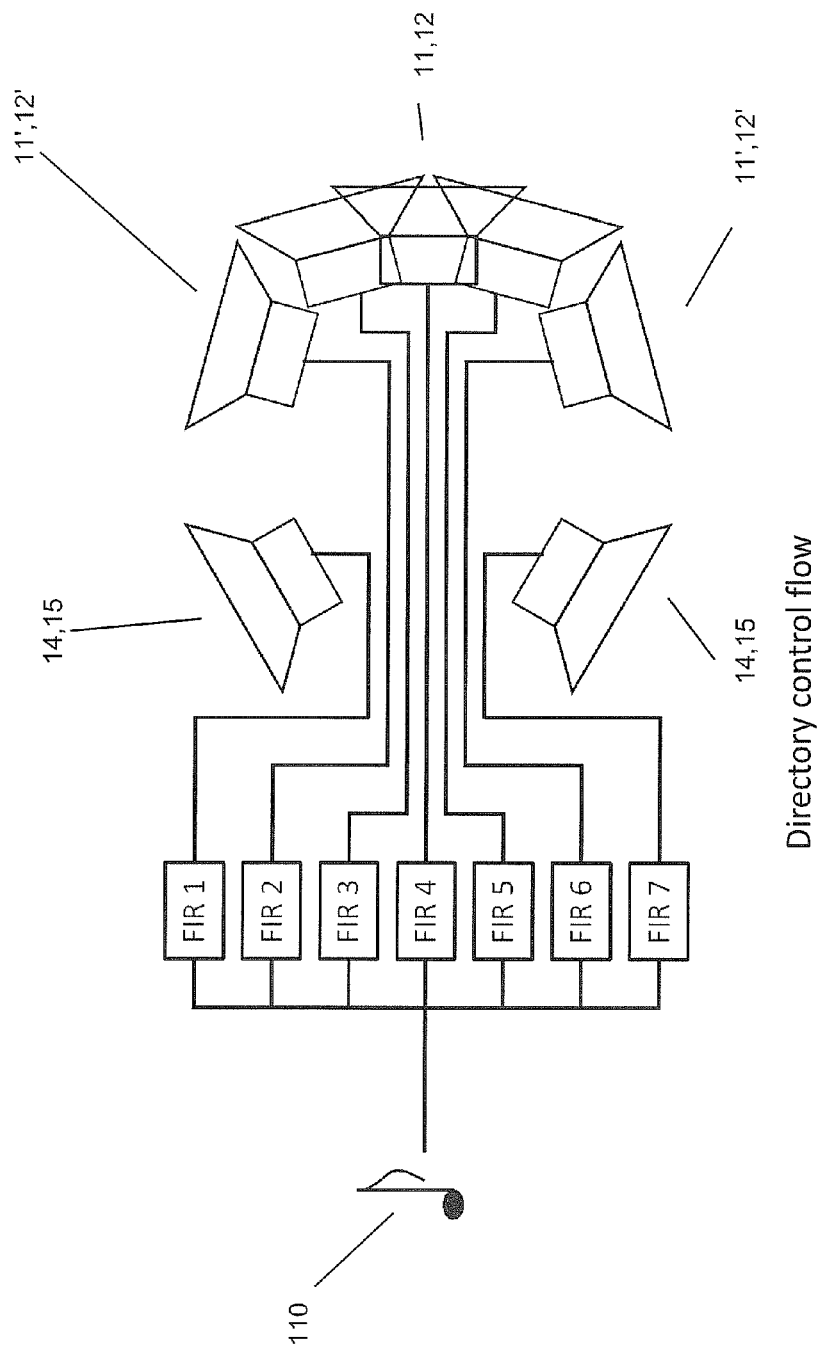
FIG. 10 shows a schematic layout of how the directivity control is arranged.
Figure 11:
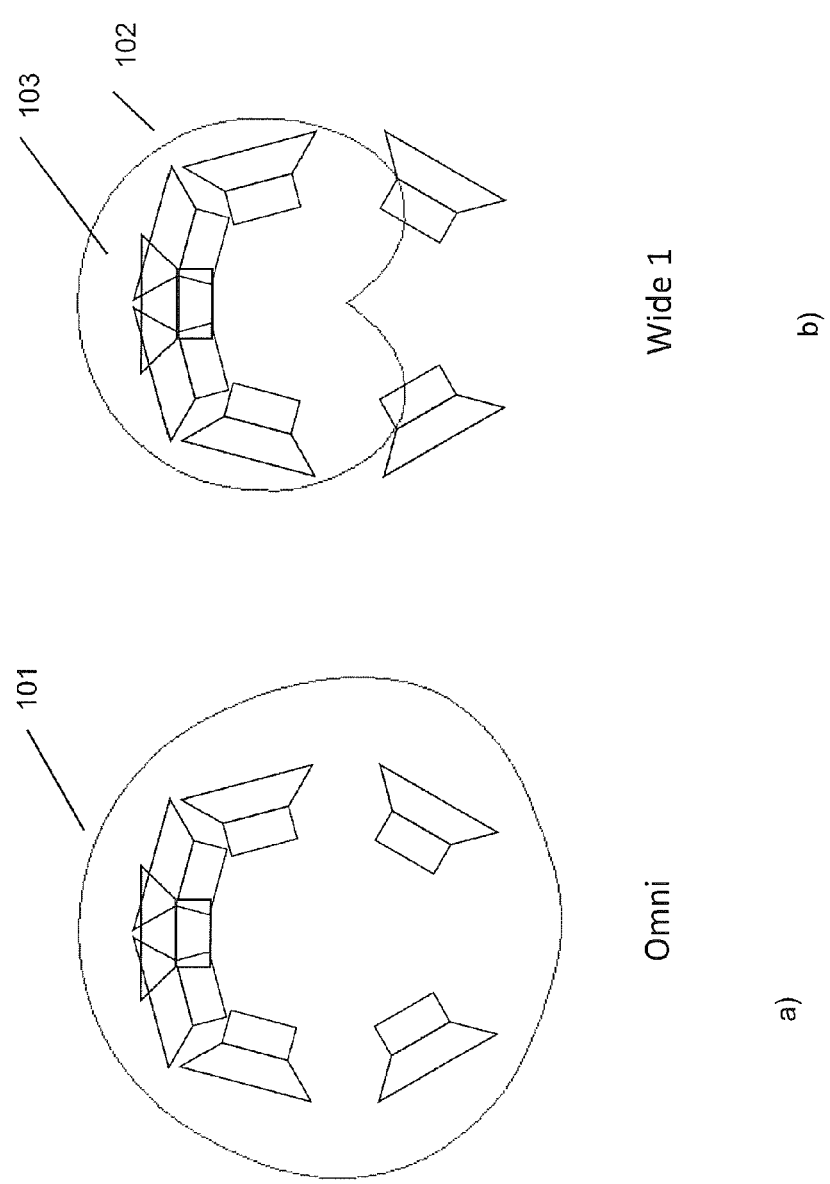
FIG. 11-14 show various directivity patterns.
Figure 12:
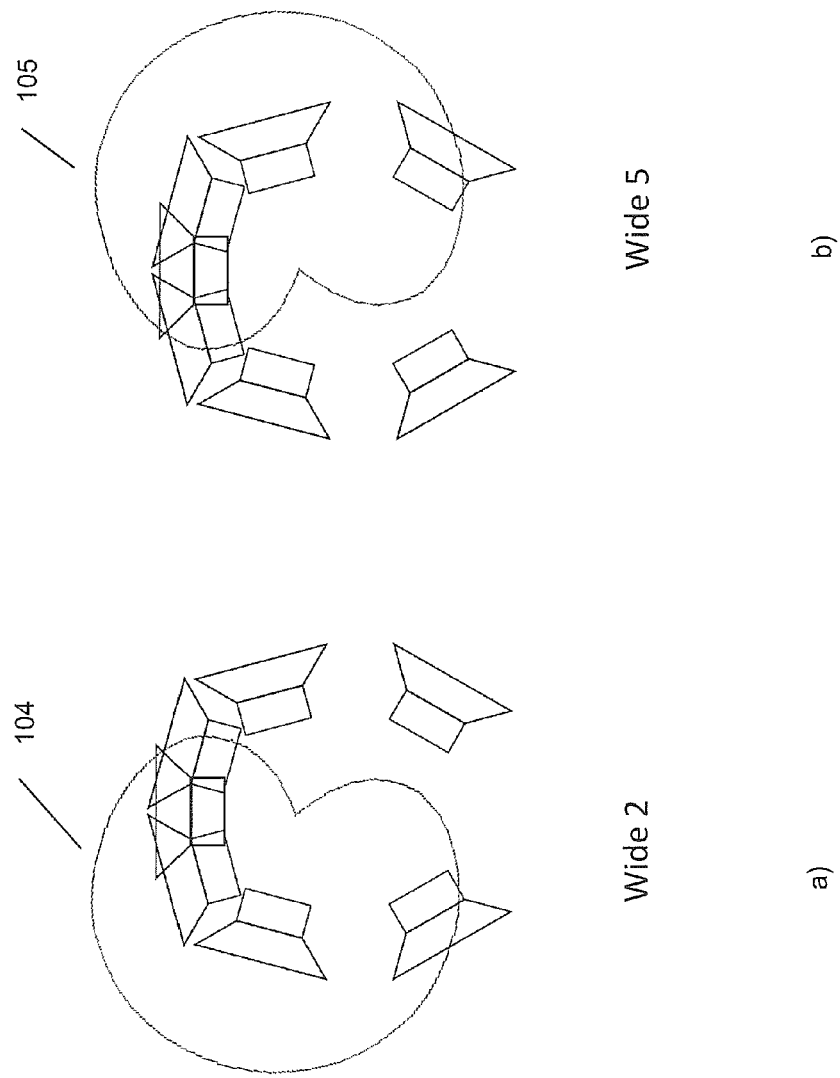
Figure 13:
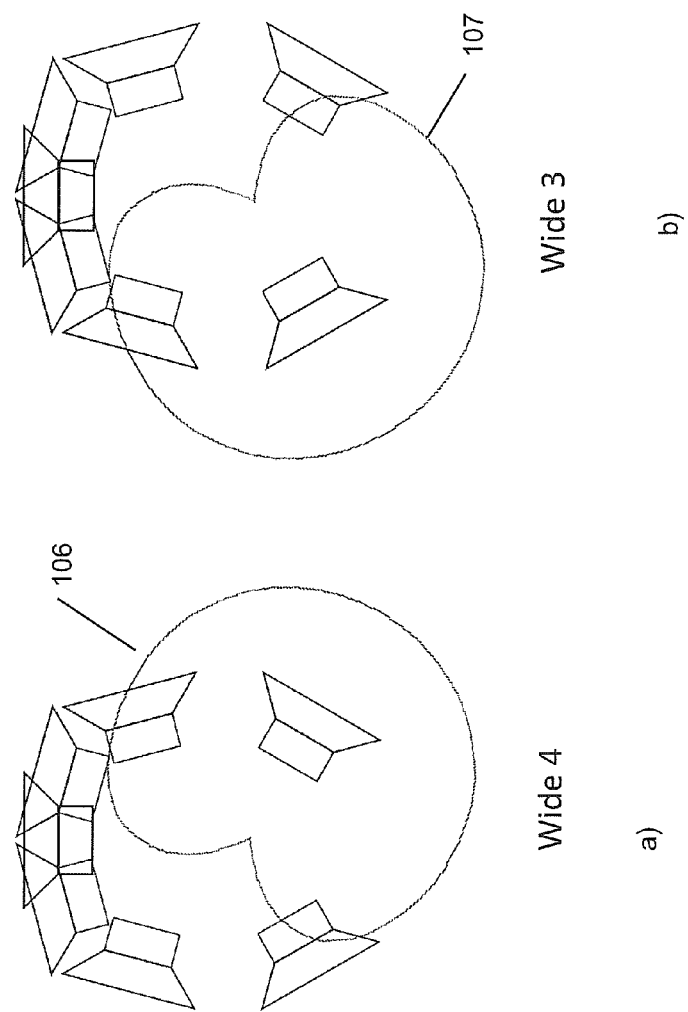

In FIG. 11 is illustrated a number of loudspeaker transducer units, for example corresponding to the configurations discussed above with reference to FIGS. 3B and 3C where the controller as will be described below with reference to FIGS. 9 and 10 has been adjusted such that all the loudspeaker transducer units will emit sound in order to obtain a substantially omnidirectional directivity 101. The curve 101 corresponds to the directivity pattern discussed above with reference to FIG. 8 indicated by reference number 81. In FIG. 11B is indicated a further directivity pattern 102 where the goal is to obtain a relatively wide sound propagation, but as is evident from the directivity 102 the sound picture, i.e. the sound which is perceived by a listener is directed forward relative to the three loudspeaker transducer units arranged closely together in a front part 103 of a loudspeaker installation. In FIGS. 12A and B is illustrated a situation where the controller has adjusted the complex gain and delay input to the loudspeaker units such that as indicated in FIG. 12A the sound directivity is to the left and in FIG. 12B the sound directivity 105 is to the right.

Common for all the examples illustrated in FIGS. 11-14 is the fact that the directivity "0" is in the theoretical centre of the loudspeaker transducer unit arrangement. This "0" corresponds to the centre of the circle indicated in FIG. 8.

In FIGS. 13A and B is illustrated a corresponding situation, however, where the directivity patterns 106, 107 are directed respectively to the rear and right and to the rear and left. This is all achieved by controlling the complex gain and delay carried out by input to the controller such that the desired directivity in a controlled manner is emitted by the loudspeaker transducer arrangement.

Figure 14:
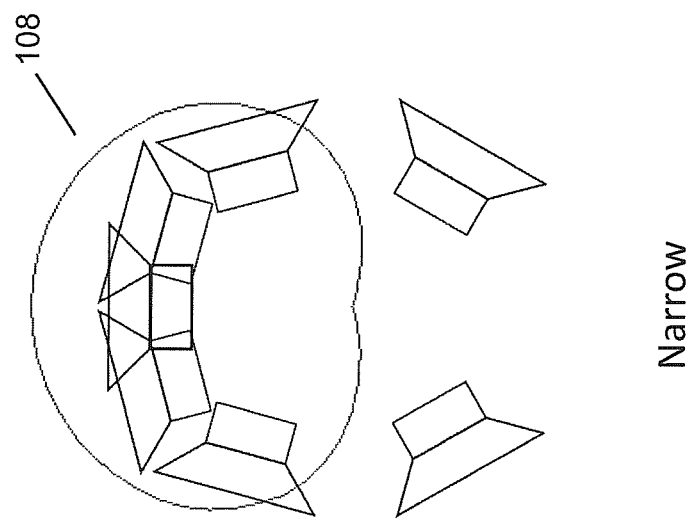

Finally, in FIG. 14 is illustrated a situation where the directivity 108 is focused in a relatively narrow forward direction such that a listener positioned as for example illustrated in FIG. 8 will perceive a complete and full sound picture.

Turning back to FIG. 9 the FIG. 9 displays a system controller (90) enabled to manage the acoustical performance of the loudspeaker system (96,97,98) according the invention. A microcomputer or a digital signal processor including memory means is the kernel of the system (90) and performing the tasks:

- Determine the acoustical characteristics of the room. A microphone (91) supports the measurement of the acoustical impedance of the room. Parameter values are stored as configuration data (95). The microphone (91) may be built-in or being a connected to an external device according to actual product requirements.
- Factory data specific data and attributes for the initial loudspeaker configuration is defined and stored as pre-set data tables (94); these might be modified or reloaded during operation via the remote connection (92); this being wired, or wireless infrared, WiFi or alike, according to actual product requirements.
- The data includes parameters as defined by "frequency dependent complex gain" control.
- Primary control command function may be given by the user via MMi means (93); the commands e.g. power on/off, initiate a specific function like "restart" or any other relevant control function may be fed to the system by the primary command function (93).

Determine the position of the user or the listening position of the user. In the preferred embodiment an external subsystem e.g. an APP on a smart phone takes care of this task. The actual values for angle and distance are communicated to the loudspeaker system via WiFi means also comprised in the remote connection (92).

Adjust the level and delay parameters for each loudspeaker transducer (96,97,98) according to the measured user position and the defined pre-set values (94) relevant for that position.

In FIG. 10 is schematically illustrated how each transducer unit 11, 12, 14, 15, for example in the configurations illustrated in FIG. 3 is provided with their own finite input response filter such that the control unit will control the FIR according to the desired input. In this context the note 110 illustrates the audio input.

The invention is applicable in any high quality sound system, this being loudspeaker system with a stereo setup or any multichannel system e.g. with five channels.

The system may adapt to the user listening position and providing the highest quality of sound as perceived by the user.

The invention claimed is:

1. A loudspeaker transducer configuration with controlled directivity, the loudspeaker transducer configuration comprising
    two or more loudspeaker arrays, each loudspeaker array comprising a plurality of sound transducer units including means for each of said sound transducer units, for control of frequency dependent complex gain for each of the sound transducer units;
    where a first loudspeaker array is configured to distribute high frequency sound, and where a second loudspeaker array is configured to distribute medium frequency sound;
    at least two of the loudspeaker arrays are arranged in a physical layout being symmetrical around a first center line related to the first loudspeaker array;
    and where the directivity of the emitted sound is directed or focused towards the listening position of a user controlled by the frequency dependent complex gain for each of the sound transducer units;
    an arrangement where at least one of the loudspeaker arrays is configured such that at least one sound transducer unit is tilted or angled relatively to other sound transducer units in the same loudspeaker array.

2. A loudspeaker transducer configuration according to claim 1, where at least two of the loudspeaker arrays are arranged in a physical layout being identical when mapped into a first plane (X,Y) in a common coordinate system.

3. A loudspeaker including a loudspeaker transducer configuration with controlled directivity as claimed in claim 2, where said loudspeaker has a loudspeaker housing having at least four side faces, and where sound transducer units from each loudspeaker array are arranged in at least three of said at least four side faces.

4. A loudspeaker transducer configuration according to claim 1, where at least two of the loudspeaker arrays are arranged in a physical layout being identical when mapped into a second plane (Y,Z) in a common coordinate system.

5. A loudspeaker including a loudspeaker transducer configuration with controlled directivity as claimed in claim 4, where said loudspeaker has a loudspeaker housing having at least four side faces, and where sound transducer units from each loudspeaker array are arranged in at least three of said at least four side faces.

6. A loudspeaker transducer configuration according to claim 1, where a third loudspeaker array is configured to distribute low frequency sound.

7. A loudspeaker including a loudspeaker transducer configuration with controlled directivity as claimed in claim 6, where said loudspeaker has a loudspeaker housing having at least four side faces, and where sound transducer units from each loudspeaker array are arranged in at least three of said at least four side faces.

8. A loudspeaker transducer configuration according to claim 6, where the first loudspeaker array of the two or more loudspeaker arrays is physically located above a second loudspeaker array of the two or more loudspeaker arrays, and where the second loudspeaker array is physically located above the third loudspeaker array.

9. A loudspeaker transducer configuration according to claim 8, where all sound transducer units are arranged in a separate damped compartment in individual physical volumes per sound transducer unit.

10. A loudspeaker including a loudspeaker transducer configuration with controlled directivity as claimed in claim 1, where said loudspeaker has a loudspeaker housing having at least four side faces, and where the sound transducer units from each loudspeaker array are arranged in at least three of said at least four side faces.

11. A loudspeaker including a loudspeaker transducer configuration with controlled directivity as claimed in claim 9, where said sound transducer has a loudspeaker housing having at least four side faces, and where sound transducer units from each loudspeaker array are arranged in at least three of said at least four side faces.

12. A loudspeaker including a loudspeaker transducer configuration with controlled directivity as claimed in claim 8, where said sound transducer has a loudspeaker housing having at least four side faces, and where sound transducer units from each loudspeaker array are arranged in at least three of said at least four side faces.

13. The loudspeaker according to claim 10, wherein a separate wireless control device is provided, where said wireless control device communicates or may communicate with means for control of each of the plurality of sound transducer units, where said communication provides input to the means for control of each of the plurality of sound transducer units relating to the users position, relative to the loudspeaker, where input is used by the means to adjust the directivity of the loudspeaker.

14. The loudspeaker according to claim 10 where all sound transducer units, drivers, filters, amplifiers and power supply units are contained in or inside said loudspeaker housing, and where said loudspeaker housing on an outer surface is provided with cooling means for said amplifiers and power supply units.

15. A loudspeaker according to claim 14 where said loudspeaker housing is made from a cast material, where said cast material is selected among one or more of the following: aluminum or an aluminum alloy, cast steel, cast iron, cement-based fiber reinforced high strength concrete or modified resin based materials.

16. The loudspeaker according to claim 10 where said loudspeaker housing is made from a cast material, where said cast material is selected among one or more of the following: aluminum or an aluminum alloy, cast steel, cast iron, cement-based fiber reinforced high strength concrete or modified resin based materials.

17. The loudspeaker unit according to claim 10 where at least two of said side faces are not planar.

18. A method of using a loudspeaker transducer configuration with controlled directivity in a loudspeaker, the loudspeaker transducer configuration comprising
- two or more loudspeaker arrays, each loudspeaker array comprising a plurality of sound transducer units including means for each of said sound transducer units, for control of frequency dependent complex gain for each of the sound transducer units;
- where a first loudspeaker array is configured to distribute high frequency sound, and where a second loudspeaker array is configured to distribute medium frequency sound;
- at least two of the loudspeaker arrays are arranged in a physical layout being symmetrical around a first center line related to the first loudspeaker array;
- and where the directivity of the emitted sound is directed or focused towards the listening position of a user controlled by the frequency dependent complex gain for each of the sound transducer units;
- an arrangement where at least one of the loudspeaker arrays is configured such that at least one sound transducer unit is tilted or angled relatively to other sound transducer units in the same loudspeaker array, where all transducer units are arranged in a separate damped compartment in individual physical volumes per sound transducer unit, wherein a wireless control device is provided and where the means for controlling the directivity of the loudspeaker communicates with said wireless control device, where a user in addition to control of loudspeaker parameters such as volume, bass and treble levels and other sound qualitative parameters, also provides information to the loudspeaker means for control of the directivity, relating to the wireless control device's position relative to the loudspeaker, which input is used to control and direct the directivity of the sound transducer units, in correspondence to the input received from the wireless control device.

19. A method according to claim 18 where the wireless control device can control the directivity of the sound transducer units independently from the position of the wireless device's position relative to the loudspeaker.

20. A method of using a loudspeaker transducer configuration with controlled directivity in a loudspeaker, the loudspeaker transducer configuration comprising
- two or more loudspeaker arrays, each loudspeaker array comprising a plurality of sound transducer units including means for each of said sound transducer units, for control of frequency dependent complex gain for each of the sound transducer units;
- where a first loudspeaker array is configured to distribute high frequency sound, and where a second loudspeaker array is configured to distribute medium frequency sound;
- at least two of the loudspeaker arrays are arranged in a physical layout being symmetrical around a first center line related to the first loudspeaker array;
- and where the directivity of the emitted sound is directed or focused towards the listening position of a user controlled by the frequency dependent complex gain for each of the sound transducer units;
- an arrangement where at least one of the loudspeaker arrays is configured such that at least one sound transducer unit is tilted or angled relatively to other sound transducer units in the same loudspeaker array, where said loudspeaker has a loudspeaker housing having at least four side faces, and where sound transducer units from each loudspeaker array are is arranged in at least three of said at least four side faces, wherein a wireless control device is provided and where a means for controlling the directivity of the loudspeaker communicates with said wireless control device, where a user in addition to control of loudspeaker parameters such as volume, bass and treble levels and other sound qualitative parameters, also provides information to the means for controlling the directivity of the loudspeaker, relating to the wireless control device's position relative to the loudspeaker, which input is used to control and direct the directivity of the sound transducer units, in correspondence to the input received from the wireless control device.

21. A method of using a loudspeaker transducer configuration with controlled directivity in a loudspeaker, the loudspeaker transducer configuration comprising
- two or more loudspeaker arrays, each loudspeaker array comprising a plurality of sound transducer units including means for each of said sound transducer units, for control of frequency dependent complex gain for each of the transducer units;
- where a first loudspeaker array is configured to distribute high frequency sound, and where a second loudspeaker array is configured to distribute medium frequency sound;
- at least two of the loudspeaker arrays are arranged in a physical layout being symmetrical around a first center line related to the first loudspeaker array;
- and where the directivity of the emitted sound is directed or focused towards the listening position of a user controlled by the frequency dependent complex gain for each of the sound transducer units;
- an arrangement where at least one of the loudspeaker arrays is configured such that at least one sound transducer unit is tilted or angled relatively to other sound transducer units in the same loudspeaker array and wherein a separate wireless control device is provided, where said wireless control device communicates or may communicate with means for control of each of the plurality of sound transducer units, where said communication provides input to the means for control of each of the plurality of sound transducer units relating to the users position, relative to the loudspeaker, where input is used by a means to control the directivity of the loudspeaker where the means for controlling the directivity of the loudspeaker communicates with said wireless control device, where a user in addition to control of loudspeaker parameters such as volume, bass and treble levels and other sound qualitative parameters, also provides information to the loudspeaker means for control of the directivity of the loudspeaker, relating to the wireless control device's position relative to the loudspeaker, which input is used to control and direct the directivity of the sound transducer units, in correspondence to the input received from the wireless control device.

* * * * *